Dec. 8, 1942.  A. L. CHRISTIANSEN  2,304,337
FISH MACHINE
Filed Sept. 7, 1937  3 Sheets-Sheet 1
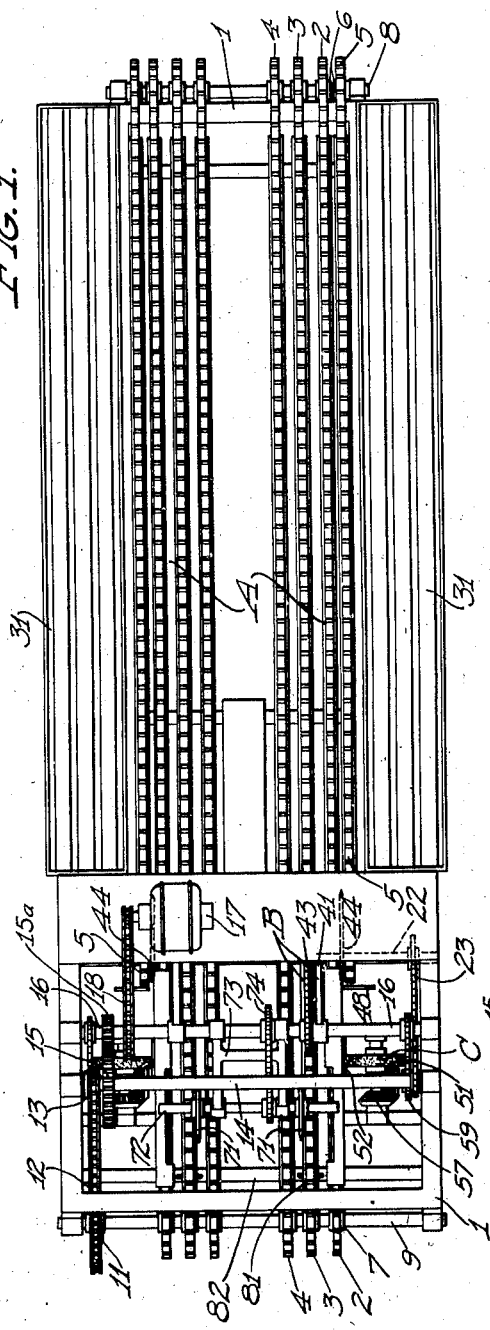
INVENTOR.
ANDREW L. CHRISTIANSEN.
BY
ATTORNEY Dec. 8, 1942.  A. L. CHRISTIANSEN  2,304,337
FISH MACHINE
Filed Sept. 7, 1937  3 Sheets-Sheet 2
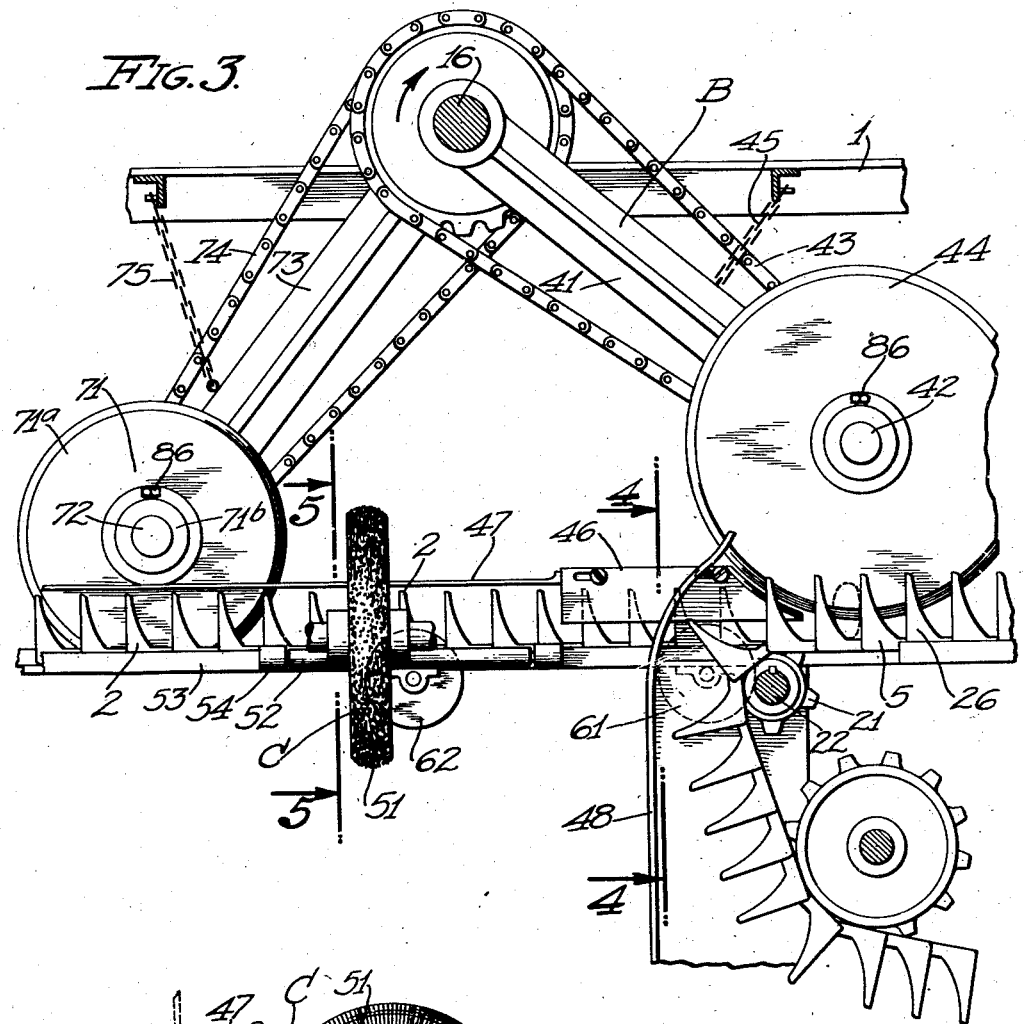
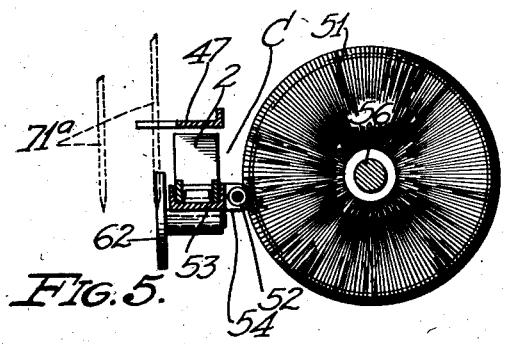
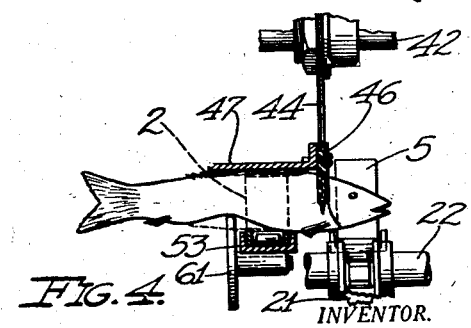
INVENTOR.
ANDREW L. CHRISTIANSEN.
BY
ATTORNEY

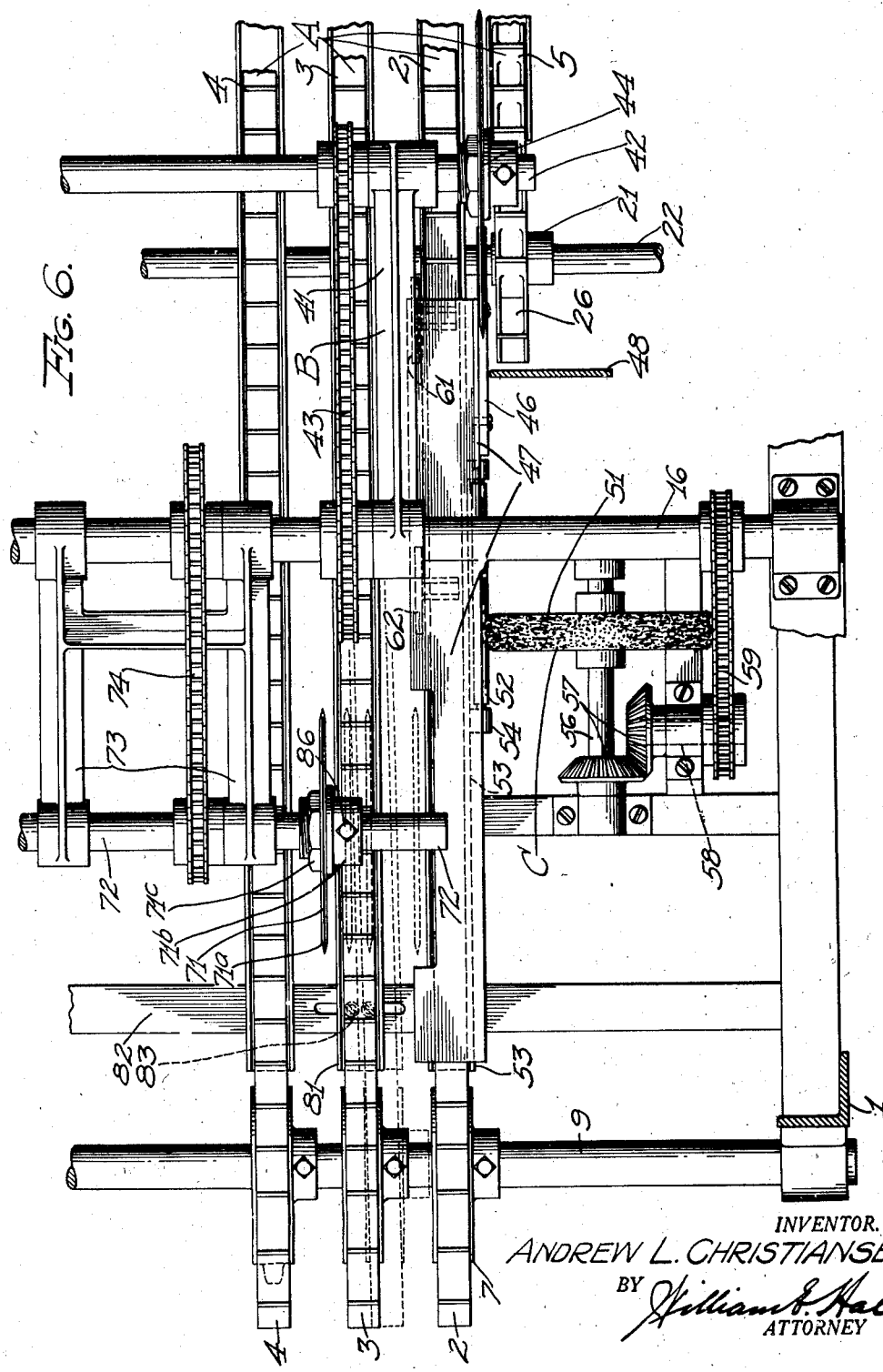

Patented Dec. 8, 1942

2,304,337

UNITED STATES PATENT OFFICE 2,304,337

FISH MACHINE

Andrew L. Christiansen, Willowbrook, Calif.

Application September 7, 1937, Serial No. 162,581

25 Claims. (Cl. 17—3)

My present invention relates to fish machines and particularly to machines for preparing sardines, or the like, for canning.

An important object of this invention is to provide novel, simple, and efficient means of removing the heads and entrails of sardines, or similar fish, after the heads have been partially severed.

Another important object of this invention is to provide novel and simple means of further extracting the entrails when the heads are removed.

An object also is the provision of novel and simple means to facilitate and aid the removal of the entrails in connection with each of the aforementioned means.

A further important object of this invention is to provide a machine of this class which may be easily adjusted so that the fish may be cut to various lengths to suit cans of various sizes.

A still further important object is the provision of a novel means of mounting cutters so that they may be easily shifted to various positions for adjustment and cutting; and in connection therewith novel means of adjusting the fish supporting conveyors relative to the cutters.

With these and other objects in view, as will appear hereinafter, I have devised a sardine machine having certain novel features of construction, combination, and arrangement of parts and portions, as will be hereinafter described in detail and particularly set forth in the appended claims, reference being had to the accompanying drawings and to the characters of reference thereon, which form a part of this application, in which:

Fig. 1 is a plan view of my machine in its preferred form of construction;

Fig. 2 is a side elevational view thereof;

Fig. 3 is an enlarged fragmentary side elevation showing the means of partially severing the heads of the fish, and the means for removing the entrails, as well as the means for cutting the fish into desired lengths;

Figs. 4 and 5 are fragmentary transverse sections taken at 4—4 and 5—5 of Fig. 3 showing the head severing and entrail removing means; and, Fig. 6 is an enlarged fragmentary plan view showing the principal features of my machine.

My sardine machine is preferably constructed as a double machine and is mounted on a frame 1. This machine has a conveyor A at each of the long sides. Each of these conveyors, in one form, consists of at least four small conveyors made up of continuous synchronized link belts 2, 3, 4, and 5, belt 5 being outermost, and belts 2, 3, and 4 being consecutively spaced inwardly. The belts 2, 3, and 4 are mounted, at the front and rear ends, on sprockets 6 and 7, which in turn are mounted on shafts 8 and 9 at the front and rear ends of the frame. The rear shaft 9 is driven by a sprocket 11 which is driven by a chain 12 from a sprocket 13 on the intermediate shaft 14 at the top of the machine. This shaft is connected by gears 15 and 15a to the main shaft 16 which is driven by a motor 17 through chain 18.

The belt 5 is shorter than the others, extending with its rear end short of the rear or discharge end of the others. The latter end extends over a small sprocket 21 which is mounted on a shaft 22 driven similar to the sprocket 7 and shaft 9, through a chain 23 from the shaft 14.

These belts consist of links 26 having outwardly extending brackets, providing pockets between adjacent brackets of adjacent links. These pockets extend transversely and are alined with similar pockets in adjacent belts. The brackets of the belt 5 are preferably longer so as to attain, at their outer ends, greater relative speed, as the brackets, which form paddles, are directed downwardly over the small sprocket 21, to cause a whipping action of said outer ends, as will be explained hereafter.

The fish, which in this instance are sardines, are dumped into long receptacles 31 which are located at the opposite sides of the frame immediately outwardly from the conveyors or link belts 5 and near the front end of the machine. These fish may be laid by attendants into the pockets of the conveyors with their bellies downwardly, and with the heads in the pockets of the belts 5 and the main body portions in the pockets of the belts 2, 3, and 4.

On the shaft 16 is mounted a head severing means B which is carried by swinging frame 41 pivotally mounted on this shaft. On the free end of the frames 41 is a cutter shaft 42 which is driven by a chain 43 from the shaft 16. On the ends of the shaft 42 are secured circular cutters 44, the cutting edge of each of which extends and operates between the pair of link belts 2 and 5 at the opposite sides of the machine. The cutters extend downwardly such a distance that they cut only through the thick back bone part of the fish, which lie with their bellies downwardly in the pockets. Near the free end of the frame 41 is preferably a stop in the form of a chain 45, which limits the low position of the frame 41 and the cutters 44 relative to the frame 1.

Each of the cutters 44 is spaced back from the aforementioned end of the belt 5 so that the heads of the fish are partly severed before they are wholly separated from the bodies by the paddles of the conveyor belt 5. Behind and in line with each of the cutters 44 is a fish retainer plate 46, which is placed on edge and mounted on the outer edge of a bridge plate 47 located immediately over the top of the belt 2. The plate 46 retains the bodies of the fish in the pockets of the belts 2, 3, and 4 when the heads are struck and separated from the bodies by the paddles of the belt 5. The bridge plate 47 holds the fish in the pockets of the conveyors 2, 3, and 4, at the top, at least until the tail ends of the fish are severed as will be later described, and also for other purposes to be described.

Spaced slightly from and beyond the downwardly directed portion of the belt 5 is a guard 48 which prevents the heads from being thrown by the paddles when severed from the bodies of the fish.

Spaced backwardly from the head severing and removing means, that is, progressively with respect to the moving conveyor is an entrail removing means C. Such means consists primarily of a circular brush 51, mounted on an axis parallel to the direction of movement of the conveyor belts, and is so located that the peripheral portion engages, from above, a ledge or rod 52 over which may hang partly removed entrails of fish carried in the pockets of belt 2. This ledge is arranged on the outer side of the channel 53 through which the belt passes. This ledge or rod is preferably a long roller which is rotatably mounted at its ends in journal brackets 54 carried on the outer side of the channel. As the overhanging entrails are moved along by the conveyor belts, the brush 51 engages the same, pressing the same against the roller 52 and thereby drawing the same from the fish bodies.

The brush 51 is mounted on a shaft 56 which is connected by gears 57 to a shaft 58 which is driven by a chain 59 from the main shaft 16.

At two locations below the belt 2 are relatively narrow rollers 61 and 62. These rollers are arranged at the side of the channel 53 opposite the belt 5 and the roller 52. These rollers 61 and 62 are located also slightly back from the downwardly extending end of the belt 5 and also ahead of the brush 51, and further in such a position that their upper peripheral portions extend above the bottoms of the pockets in the belt 2, so that the fish, when travelling over the rollers 61 and 62, are pressed upwardly against the bridge plate 47. This compressing force tends to squeeze or urge the entrails toward the head end. Thus, the entrails are more easily extracted when the head is removed, and any torn entrails are more easily drawn from the bodies by the brush 51 and roller 52.

The fish are cut to the desired length by a circular cutter 71, one for each side of the machine. Each cutter is axially adjustable on a shaft 72 which is carried at the free end of a frame 73 pivoted at its other end on the main shaft 16, there being one of such frames at each end of the shaft. The shaft 72 is driven by a chain 74 from the shaft 16. The frame 73 extends in an angular direction from the shaft 16 opposite to that of the frame 41, and is also limited in its downward position by a chain 75, or other suitable means.

Sardines are cut to various lengths to fit various sizes and shapes of cans. I have so constructed my machine that the fish cleaned thereby may be cut thereby to various lengths by only slight manipulation and adjustment. This adjustment is effected by the axial shifting of the cutter 71 and by the corresponding lateral shifting of the discharge end of the belt 3, that is, by the axial shifting of its supporting sprocket 7 on the drive shaft 9. The belt 3 is of such length that the sprocket 7 may be easily shifted a considerable distance without binding, friction or loss of efficiency.

The upper portion of the belt is carried in a channel 81. This channel is also shifted laterally, at or near the discharge end of the belt 3, on a transverse support 82, and may be secured in such adjusted position by screws 83. This shiftable channel guides the belt or chain when it is desired to shift or adjust the discharge end of the chain laterally.

The cutter 71 consists of a cutting disc 71$^a$ which is mounted on a hub 71$^b$ and secured to the hub by a nut 71$^c$. The hub 71$^b$ is adjusted axially on the shaft 72 and secured in the various adjusted positions by a set screw 86.

The cutting disc may assume various cutting positions shown by solid and dotted lines, at the opposite sides of the belt 3. In order to shift the cutter to the opposite sides of the belt 3, it may be raised by pivoting the same about the shaft 16.

Though I have shown and described a particular construction, I do not wish to be limited to the same, but desire to include in the scope of my invention the construction, combination, and arrangement, substantially as set forth in the appended claims.

I claim:

1. In a machine of the class described, a belt conveyor having transverse fish carrying pockets, and another belt conveyor synchronized therewith and provided with paddles extending outwardly from the latter belt conveyor, adjacent paddles providing openings substantially in alignment with the pockets of the first conveyor, the latter conveyor being positioned with one end short of the discharge end of the first conveyor, the said one end of the latter conveyor being directed abruptly downwardly about a relatively short radius, to cause the paddles to be substantially whipped downwardly at the adjacent ends of the pockets.

2. In a machine of the class described, a belt conveyor having transverse fish-carrying pockets, and another belt conveyor synchronized therewith and provided with paddles extending outwardly from the latter belt conveyor, adjacent paddles providing openings substantially in alignment with the pockets of the first conveyor, the latter conveyor being positioned with one end short of the discharge end of the first conveyor, the said one end of the latter conveyor being directed about a relatively short radius abruptly downwardly and at a slight angle backwardly, to cause the paddles to be substantially whipped about a transverse axis at the said one end of said latter conveyor at the adjacent ends of the pockets of the first conveyor.

3. In a machine of the class described, a belt conveyor having transverse fish carrying pockets, another belt conveyor synchronized therewith and provided with paddles, the latter conveyor being positioned with one end short of the discharge end of the first conveyor, the said one end of the latter conveyor being directed abruptly downwardly, and a cutter positioned with its cutting edge between the two conveyors and with its lower edge above the bottom of the pockets.

4. In a machine of the class described, a belt conveyor having transverse fish carrying pockets, another belt conveyor synchronized therewith and provided with paddles, a cutter positioned with its cutting edge between the two conveyors and with its lower edge above the bottom of the pockets, the second conveyor being positioned with one end short of the discharge end of the first conveyor, and a wheel of small radius over which the latter end of the paddle conveyor extends downwardly.

5. In a machine of the class described, a belt conveyor having transverse fish-carrying pockets, another belt conveyor synchronized therewith and provided with paddles, the latter conveyor being positioned with one end short of the discharge end of the first conveyor, the said one end of the latter conveyor being directed abruptly downwardly, and a stationary retaining plate immediately above the first conveyor at the said one end of the paddle conveyor, said plate extending partially between the conveyors back from the downwardly directed portion of said latter conveyor, and partially beyond the downwardly directed portion of the latter, to retain portions of the fish in the pockets while other portions are forced downwardly by the paddles.

6. In a machine of the class described, a conveyor having transverse pockets, a member, stationary with respect to the conveyor, extending immediately alongside the conveyor at one end of and below the pockets therein, and a circular brush revolubly mounted at the side of the member opposite the conveyor and adapted to engage the member with its peripheral portion for drawing entrails from the fish in the pockets of the conveyor.

7. In a machine of the class described, a conveyor having transverse pockets, a rod extending immediately alongside the conveyor at one end of and below the pockets therein, and a circular brush revolubly mounted at the side of the rod opposite the conveyor and adapted to engage the rod with its peripheral portion for drawing entrails from the fish in the pockets of the conveyor.

8. In a machine of the class described, a conveyor having transverse pockets, a long roller of small diameter extending immediately alongside the conveyor at one end of and below the pockets therein, and a circular brush revolubly mounted at the side of the roller opposite the conveyor and adapted to engage the roller with its peripheral portion for drawing entrails from the fish in the pockets of the conveyor.

9. In a machine of the class described, a belt conveyor having transverse fish carrying pockets, another belt conveyor synchronized therewith and provided with paddles, the later conveyor being positioned with one end short of the discharge end of the first conveyor, the said one end of the latter conveyor being directed downwardly, a member, stationary with respect to the first conveyor, extending immediately alongside the first conveyor beyond said end of said latter conveyor and at one end of and below the pockets of the first conveyor, and a circular brush revolubly mounted at the side of the member opposite the first conveyor and adapted to engage the member with its peripheral portion for drawing entrails from the fish in the pockets of the first conveyor.

10. In a machine of the class described, a belt conveyor having transverse fish carrying pockets, another belt conveyor synchronized therewith and provided with paddles, the later conveyor being positioned with one end short of the discharge end of the first conveyor, the said one end of the latter conveyor being directed downwardly, a rod extending immediately alongside the first conveyor beyond said end of said latter conveyor and at one end of and below the pockets of the first conveyor, and a circular brush revolubly mounted at the side of the rod opposite the first conveyor and adapted to engage the rod with its peripheral portion for drawing entrails from the fish in the pockets of the first conveyor.

11. In a machine of the class described, a belt conveyor having transverse fish carrying pockets, another belt conveyor synchronized therewith and provided with paddles, the latter conveyor being positioned with one end short of the discharge end of the first conveyor, the said one end of the latter conveyor being directed downwardly, a long roller of small diameter positioned beyond said end of said latter conveyor and at one end of and below the pockets of the first conveyor, and a circular brush revolubly mounted at the side of the roller opposite the first conveyor and adapted to engage the roller with its peripheral portion for drawing entrails from the fish in the pockets of the first conveyor.

12. In a machine of the class described, a conveyor having transverse fish carrying pockets, means at one side of the conveyor for removing partially severed heads of fish carried in said pockets, and thereby extracting entrails from the bodies of the fish, and pressure means at the opposite side of the conveyor for exerting pressure on the body of the fish near the tail end and thereby facilitating the extraction of the entrails.

13. In a machine of the class described, a belt conveyor having transverse fish carrying pockets, another belt conveyor mounted along one side of the same and synchronized therewith and provided with paddles, the latter conveyor being positioned with one end short of the discharge end of the first conveyor, the said one end of the latter conveyor being directed downwardly for removing partially severed heads of fish carried in said pockets, and thereby extracting entrails from the bodies of the fish, and pressure means at the side of the first conveyor opposite said latter conveyor for exerting pressure on the body of the fish near the tail end and thereby facilitating the extraction of the entrails.

14. In a machine of the class described, a conveyor having transverse pockets, a member, stationary with respect to the conveyor, extending immediately alongside the conveyor at one end of and below the pockets therein, a circular brush revolubly mounted at the side of the member opposite the conveyor and adapted to engage the member with its peripheral portion for drawing entrails from the fish in the pockets of the conveyor, and pressure means at the opposite side of the conveyor for exerting pressure on the body of the fish near the tail end and thereby facilitating the extraction of the entrails.

15. In a machine of the class described, a conveyor having transverse pockets, a rod extending immediately alongside the conveyor at one end of and below the pockets therein, a circular brush revolubly mounted at the side of the rod opposite the conveyor and adapted to engage the rod with its peripheral portion for drawing entrails from the fish in the pockets of the conveyor, and pressure means at the opposite side of the conveyor for exerting pressure on the body of the fish near the tail end and thereby facilitating the extraction of the entrails.

16. In a machine of the class described, a conveyor having transverse fish carrying pockets, means at one side of the conveyor for removing partially severed heads of fish carried in said pockets, and thereby extracting entrails from the bodies of the fish, a member, stationary with respect to the conveyor, extending immediately alongside the conveyor beyond said head removing means and at one end of and below the pockets of the conveyor, a circular brush revolubly mounted at the side of the member opposite the conveyor and adapted to engage the member with its peripheral portion for drawing entrails from the fish in the pockets of the conveyor, and pressure means at the side of the conveyor opposite said brush for exerting pressure on the body of the fish near the tail end and thereby facilitating the extraction of the entrails.

17. In a machine of the class described, a conveyor having transverse fish carrying pockets, means at one side of the conveyor for removing partially severed heads of fish carried in said pockets, and thereby extracting entrails from the bodies of the fish, a rod extending immediately alongside the conveyor beyond said head removing means and at one end of and below the pockets of the conveyor, a circular brush revolubly mounted at the side of the rod opposite the conveyor and adapted to engage the rod with its peripheral portion for drawing entrails from the fish in the pockets of the conveyor, and pressure means at the side of the conveyor opposite said brush for exerting pressure on the body of the fish near the tail end and thereby facilitating the extraction of the entrails.

18. In an apparatus of the class described, a conveyor consisting of a plurality of long synchronized belts, a pair of shafts, and sprockets on each shaft on which the opposite ends of the belts are mounted, the sprocket at one end of one of the belts being axially adjustable on one shaft, the sprocket at the opposite end of the latter belt being axially fixed.

19. In an apparatus of the class described, a conveyor consisting of a plurality of long synchronized belts, a pair of shafts, sprockets on each shaft on which the opposite ends of the belts are mounted, and guides intermediate the shafts upon which the upper portions of the belts ride, the sprocket at one end of one of the belts being axially adjustable and the adjacent end of the corresponding guide being laterally shiftable, the sprocket at the opposite end of the latter belt being axially fixed.

20. In an apparatus of the class described, a frame, a conveyor mounted on the frame and having transverse fish-carrying pockets, each divided longitudinally into sections, the corresponding sections of the pockets forming longitudinal series of pocket sections with respect to the longitudinal extent of the conveyor, and a cutter vertically movable on the frame with its cutting edge positioned to one side of one series of pocket sections of the conveyor, said cutter being so mounted as to be raised to facilitate lateral shifting of the cutter from said one side of said series of pocket sections to the opposite side.

21. In an apparatus of the class described, a frame, a conveyor mounted on the frame and having transverse fish-carrying pockets, each divided longitudinally into sections, the corresponding sections of the pockets forming longitudinal series of pocket sections with respect to the longitudinal extent of the conveyor, and a cutter vertically movable on the frame with its cutting edge positioned to one side of one series of pocket sections of the conveyor and below the top thereof, said cutter being axially shiftable and so mounted as to be raised with respect to the conveyor and to be shifted to the opposite side of said one series of pocket sections.

22. In an apparatus of the class described, a frame, a conveyor mounted on the frame and having transverse fish-carrying pockets, each divided longitudinally into sections, the corresponding sections of the pockets forming longitudinal series of pocket sections with respect to the longitudinal extent of the conveyor, a cutter frame pivoted at one end on the first frame above the conveyor, and a cutter mounted on the free end of the cutter frame, said cutter extending with its cutting edge to one side of one series of pocket sections of the conveyor, said cutter being axially adjustable on the free end of the cutter frame, said cutter being so mounted as to be raised with the free end of the frame above the conveyor and to be shifted thereover to the opposite side of said one series of pocket sections.

23. In an apparatus of the class described, a frame, a conveyor mounted on the frame and having transverse fish-carrying pockets, each divided longitudinally into sections, the corresponding sections of the pockets forming longitudinal series of pocket sections with respect to the longitudinal extent of the conveyor, a cutter frame pivoted at one end on the first frame above the conveyor, and a cutter mounted on the free end of the cutter frame, said cutter extending with its cutting edge to one side of one series of pocket sections of the conveyor, said cutter being axially adjustable with respect to said series of pocket sections and so mounted as to be raised with the free end of the cutter frame above the conveyor, and also mounted as to be shifted laterally thereover to the opposite side of said one series of pocket sections.

24. In an apparatus of the class described, a conveyor consisting of a plurality of long synchronized belts, one of the belts being laterally adjustable, and a vertically movable cutter frame having an exially adjustable cutter adapted to extend with its cutting edge to the side of said laterally adjustable belt, said cutter being mounted so as to be raised to facilitate shifting of the cutter from one side to the other of said laterally adjustable belt.

25. In an apparatus of the class described, a conveyor consisting of a plurality of long synchronized belts, a pair of shafts, sprockets on each shaft upon which the opposite ends of the belts are mounted, the sprocket at one end of one of the belts being axially adjustable on its shaft, the sprocket at the opposite end of the latter belt being axially fixed, a frame above the conveyor, and a cutter extending with its cutting edge between adjacent belts of the conveyor and axially adjustable on the frame, said cutter being mounted so as to be capable of being raised above and shifted laterally over the laterally adjustable belt.

ANDREW L. CHRISTIANSEN.